United States Patent [19]

Takeuchi

[11] Patent Number: 5,099,899
[45] Date of Patent: Mar. 31, 1992

[54] PNEUMATIC RADIAL TIRE FOR HEAVY LOAD VEHICLES HAVING INCREASING CIRCUMFERENTIAL GROOVE AMPLITUDE WITH WEAR

[75] Inventor: Akihiro Takeuchi, Kobe, Japan

[73] Assignee: Sumitomo Rubber Industries, Ltd., Hyogo, Japan

[21] Appl. No.: 488,500

[22] Filed: Mar. 5, 1990

Related U.S. Application Data

[63] Continuation of Ser. No. 131,588, Dec. 11, 1987, abandoned, which is a continuation-in-part of Ser. No. 784,894, Oct. 7, 1985, abandoned.

[30] Foreign Application Priority Data

Oct. 13, 1984 [JP] Japan ................. 59-214743

[51] Int. Cl. .............................................. B60C 11/06
[52] U.S. Cl. .............................................. 152/209 R
[58] Field of Search ........... 152/209 R, 209 A, 209 B, 152/209 D

[56] References Cited

U.S. PATENT DOCUMENTS

| | | | |
|---|---|---|---|
| 3,055,410 | 9/1962 | Caulkins | 152/209 R |
| 3,664,402 | 5/1972 | Montagne | 152/209 R |
| 4,258,691 | 3/1981 | Nakayama | 152/209 R |
| 4,262,722 | 4/1981 | Takigawa et al. | 152/209 R |
| 4,271,885 | 6/1981 | Takigawa et al. | 152/209 R |
| 4,271,886 | 6/1981 | Bachmann et al. | 152/209 R |
| 4,423,760 | 1/1984 | Treves et al. | 152/209 R |
| 4,630,661 | 12/1986 | Stelzer | 152/209 R |

FOREIGN PATENT DOCUMENTS 92902 5/1986 Japan .

*Primary Examiner*—Geoffrey L. Knable
*Attorney, Agent, or Firm*—Stevens, Davis, Miller & Mosher

[57] ABSTRACT

A pneumatic radial tire for heavy load vehicles which is constructed to effectively suppress railway wear, and which has a tire tread provided with at least one circumferential groove to divide a tread in the widthwise direction and a carcass comprising at least one carcass ply of substantially radially extending rubber coated steel cords and a belt layer for reinforcing a crown portion of said carcass ply; wherein the zigzag angle of the main circumferential grooves with respect to an equatorial line of the tire increases in angle as the tread wears out.

3 Claims, 6 Drawing Sheets

E-E

L-L

K-K

M-M

90% WEAR

50% WEAR

0% WEAR

PNEUMATIC RADIAL TIRE FOR HEAVY LOAD VEHICLES HAVING INCREASING CIRCUMFERENTIAL GROOVE AMPLITUDE WITH WEAR

RELATED APPLICATIONS

This application is a continuation-in-part of application Ser. No. 131,588, filed Dec. 11, 1987 now abandoned, which is a continuation-in-part of application Ser. No. 784,894, filed Oct. 7, 1985, now abandoned.

PRESENT INVENTION

This invention relates to pneumatic radial tires for heavy duty vehicles such as trucks, buses and the like, more particularly to a pneumatic radial tire provided with rib shaped tread pattern suitable for travel on paved roads at a high speed, while improving its wear resistant properties and effectively reducing uneven wear of the tread without sacrificing wet grip performance.

In general, a pneumatic radial tire provided with a reinforcing belt layers composed of steel cords, in respect of wear resistance, puncture resistance, and saving fuel expense, is superior to the conventional bias tire because of high rigidity of the belt layers between the tread rubber and the carcass ply. On the other hand its riding comfort rather falls behind that of bias tires because its belt layers have a high rigidity; therefore the development of such radial tire having the properties as described above tends to advance along with the improvement of roads. In recent years in Japan along with arrangement and extension of the highway networks, the demand for pneumatic radial tires has been increasing remarkable. In general, as tread patterns of pneumatic radial tires, rib types, lug types, rib-lug types, block types and rib-block types etc are employed according to its usage respectively, particularly from the view point of traction properties, low heat build up properties, and wet grip performance. A tire for heavy duty trucks and buses preferably employs rib type tread patterns and block type tread patterns.

However, the blocks-type pattern applied to a pneumatic radial tire for heavy vehicles has the disadvantage that such a block pattern has a comparatively smaller area which makes contact with the roads while the tire is in rotation. Said blocks pattern has a tendency to wear fast due to excessive movement of the blocks while the tire rotates. Furthermore the rotation has a tendency to induce uneven wear in the front and the rear of the block, which greatly reduces the tire life. In order to obtain such properties as low heat generation and high wear resistance together with high traction and braking performance adequate for use on the highway at high speeds, generally, the so-called rib-type tread pattern types provided with a plurality of continuous ziqzag grooves extending circumferentially of said tread are preferably employed, although said ribs are generally continuous in the circumferential direction. There are some modifications of said rib type tread patterns, for example, setting some narrower circumferential grooves on said ribs, or otherwise, setting comparatively shallower lateral grooves extending in the width direction of the tire, and blocks and ribs are provided together with so-called rib-block type tread pattern also. In any case, peculiar abnormal wears occur in the rib edge regions or in the shoulder regions when continuously running over a long distance at a high running speed.

The radial tire has a peculiarity of construction when provided at its crown portion with a circumferential belt layer having a high rigidity. Such a tire has excellent wear resistance, but due to the difference of rigidity among the tread portions uneven wear phenomenon is apt to be induced. Because wear life of the tires is long, said phenomenon becomes aggravated and makes the worn appearance of the tire noticeably worse.

There are various kinds of abnormal wear associated with tires for heavy duty vehicles which are classified in the three kinds, that is:

(1) Wear which causes generation of steps extending transversely in the cross-sectional direction of the tire, particularly causing the tread rubber facing both the shoulder portions to wear more readily than the tread rubber facing the center portion, which is called uneven shoulder wear.

(2) Wear which causes indentations or steps to be produced across the boundary of a substantially transverse groove which defines a tread pattern is called heel and toe wear.

(3) Wear which abnormally occurs at that portion of circumferential ribs defined by a circumferential groove which is adjacent to the circumferential groove, which is called railway wear. It is an object of the invention to prevent especially occurrence of railway wear of the tire in all kinds of such uneven wear. Therefore, the invention will be described in detail concerning railway wear, which starts from a side edge portion L of a circumferential rib 5 defined by tread grooves 4 of a tire 1 and gradually spreads in the circumferential direction over a region with a stepwise difference d and a width W as shown in FIG. 3 when the tire continuously runs straight over a long distance at a high speed.

Such abnormal and uneven wear not only negatively affects the appearance of the tire 1, but also adversely affects tire performance, especially traction performance, braking performance, and cornering performance, which largely reduce the useful tire life. Heretofore, as a countermeasure for the above mentioned abnormal wear, some disclosures, for example, Japanese patent publication No. 51-15282 and No. 46-4553 etc have been proposed, but hitherto none has led to fully satisfactory results which can effectively avoid all kinds of uneven wear of the tire. For example, as described in Japanese patent publication No. 51-15282, the cross sectional width of a circumferential qroove adjacent to the central rib is set up to increase radially, accordingly, the width of the central rib radially decreases, and to prevent stone-pick-up, setting a portion separated from said rib portions and forming the cross sectional shape of grooves as an inverted V shape to eliminate railway wear, which occurs at a side edge portion of a circumferential rib, which has problems in production due to complicated groove shape. Moreover the notches of both sides of groove tend to pick up stones, so as to damage both the edges of the rib portions. Heretofore no one solution has led to fully satisfactory results which can effectively avoid all kinds of uneven wear of such a tire.

BRIEF SUMMARY OF THE INVENTION

It is an object of the invention to provide pneumatic radial tires advantageously adaptable for heavy duty vehicles, which can effectively prevent railway wear which has not heretofore been solved by any prior solutions and can prolong tire life, while keeping the features of the rib type pattern.

In the rib type tread pattern tire especially for heavy vehicles, the protruding points of the zigzag rib are apt to wear and the wear extends circumferentially along the rib edge. This type of wear, as previously mentioned, is called railway wear.

An object of the invention is to eliminate undesirable railway wear along the rib edges.

The deeper the groove (i.e. the higher the rib), the larger the movement of the protruding point when contacting the road, and the steeper the point, the larger the movement, and further the larger the movement, the larger the wear.

BRIEF DESCRIPTION OF THE DRAWINGS

FIG. 8 showing 0% wear (new); FIG. 9 showing 50% wear and FIG. 10 showing 90% wear.

DETAILED DESCRIPTION

According to the invention, there is a provision in a heavy duty pneumatic radial tire constructed effectively to suppress railway wear having a tire tread provided with at least one circumferential groove to divide the tread along the widthwise direction of the tire and a carcass of a substantially radial construction composed of at least one rubberized ply layer containing cords embedded therein and a belt superimposed about said carcass for stiff reinforcement beneath the tread, said tread being provided with a plurality of circumferential zigzag grooves, wherein the angle with respect to an equatorial line and the point height of said circumferential zigzag groove become larger as the tread wears out.

Figure 1:
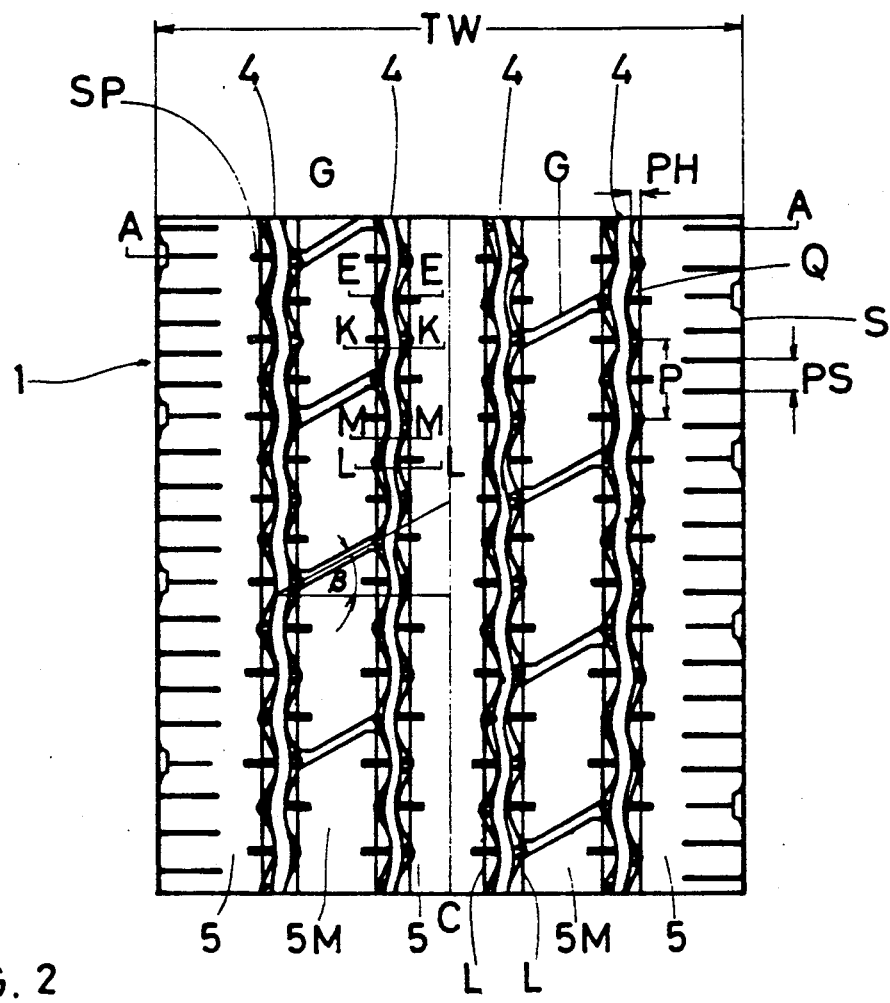
FIG. 1 is a plane view of an embodiment of the tread pattern in the tire according to the invention.
Figure 2:
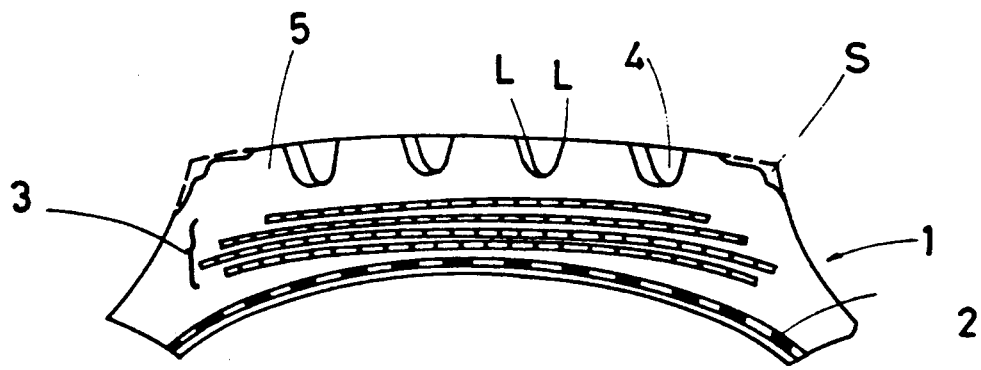
FIG. 2 is a schematic cross-sectional view of tread construction taken along line A—A of FIG. 1.
Figure 3:
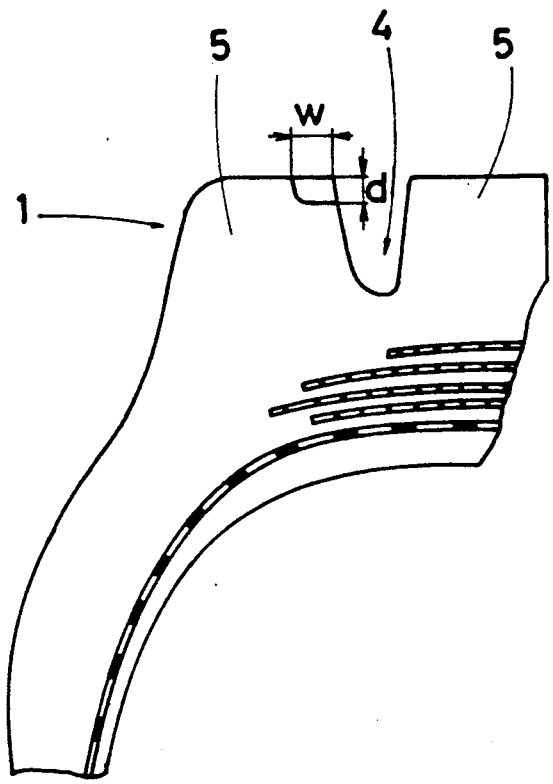
FIG. 3 is a partially radial sectional view of a tire illustrating the occurrence of railway wear.

The invention will now be described in detail with reference to the accompanying drawings illustrating an example according to the present invention. As shown in FIG. 1 and FIG. 2, a heavy duty pneumatic radial tire comprises a carcass 2 of a substantially radial construction comprising of at least one rubberized ply layer containing cords embedded therein and a belt 3 superimposed about said carcass for stiff reinforcement beneath a tread 1 and said tread 1 is provided with five rows of ribs 5 defined along the widthwise direction of the tire by wide grooves 4 extending circumferentially of said tread.

The side edge portion L of said wide ribs defined in the tread surface by circumferential groove 4 is substantially parallel with the equatorial line C of the tire when the tire is still new. However, as the tread wears said straight line L become a zigzag line with a constant pitch P, in which the point height PH is designed to be a range of 0 to 2%, more preferably 0 to 1.5% of the tread width TW when the tire is new, and to become greater as tread wear progresses, to a range of 1 to 4%, more preferably 2 to 4% of the tread width at maximum value. FIGS. 7-10 schematically illustrate this change in point height.

When the tire is new and the groove depth is deepest and the tread stiffness on contact area with the ground is extremely low, and the point height is set up to be larger than 2% of the tread width, the stiffness of the pointed end of the zigzag shaped rib facing the groove become lower than that of the other parts, thus abnormal wear starts from a said pointed end portion of a circumferential zigzag rib and gradually spreads in the circumferential direction over a region with a stepwise difference d and a width W, accordingly, the step pointheight PH of a new tire having a good contact performance with the ground is preferred to be smaller than 2% of the tread width.

However, the traction performance decreases at the same time as tread wear progresses and stiffness of the tread surface contacting with the ground increases, so, in order to compensate for the reduction of said traction performance, the circumferential grooves are set up to increase their point-height in accordance with the tread wear and a maximum value of said point height is set up to be in a range of 1 to 4% of the tread width (TW); when it is larger than 4%, in spite of increasing the tread contactive performance, owing to service conditions, there is a possibility of an occurrence of said railway wear. On the contrary, when it is less than 1%, due to decreasing the tread contactive performance, the traction performance and many other kinds of tire performance are apt to be decreased. Furthermore, in order to increase the performance of the worn tires, especially the wet grip performance, slits SP are disposed on the pointed ends of the zigzag grooves as shown in FIG. 1.

Lateral grooves G with the inclination angle $\beta$ with respect to the axial direction of the tires are disposed on the pointed ends of the zigzag grooves every two pitches, and the depth of said lateral groove is set up to be less than 20% of the depth of main groove 4. If it is more than 20%, the continuity of the ribs extending in the circumferential direction is disrupted. As a countermeasure to prevent so-called shoulder wear, slits SP are disposed on both tread edges every pitch PS This slit SP is effective as a countermeasure for preventing not only said shoulder wear but also the wandering phenomenon, because of making it easy to ride across railway tracks and the like by the way of setting slits deeply on the buttress side as shown in FIG. 2.

In order to make clear the effectiveness of the present invention, comparative test result of one embodiment according to the invention and a prior art tire will be hereafter explained. One embodiment is a heavy duty pneumatic radial tire having a size of 10.00 R 20, comprising a carcass of a substantially radial construction composed of at least one rubberized ply layer containing cords embedded therein and a belt superimposed about said carcass for stiff reinforcement beneath the tread and composed of at least three rubberized ply layers each containing metal cords embedded therein, said metal cords being crossed with each other at a relatively small angle with respect to the circumferential direction of tire, and said tread being provided with five continuous circumferential ribs each having substantially the same width defined along the widthwise direction of the tire by at least four main circumferential grooves 4 as shown in FIG. 1, which is a so-called "five rib pattern", a plurality of lateral shallow grooves G are provided on the intermediate ribs (5M) every two pitches of zigzag pattern, said lateral shallow grooves have an inclination angle (β) of 45° with respect to the axial direction of tire, and a plurality of slits SP are disposed on the pointed end portion Q of a zigzag rib by knife blades with a 0.8 thickness, the angle of said slits being made parallel to the axial direction of tires.

Figure 7:
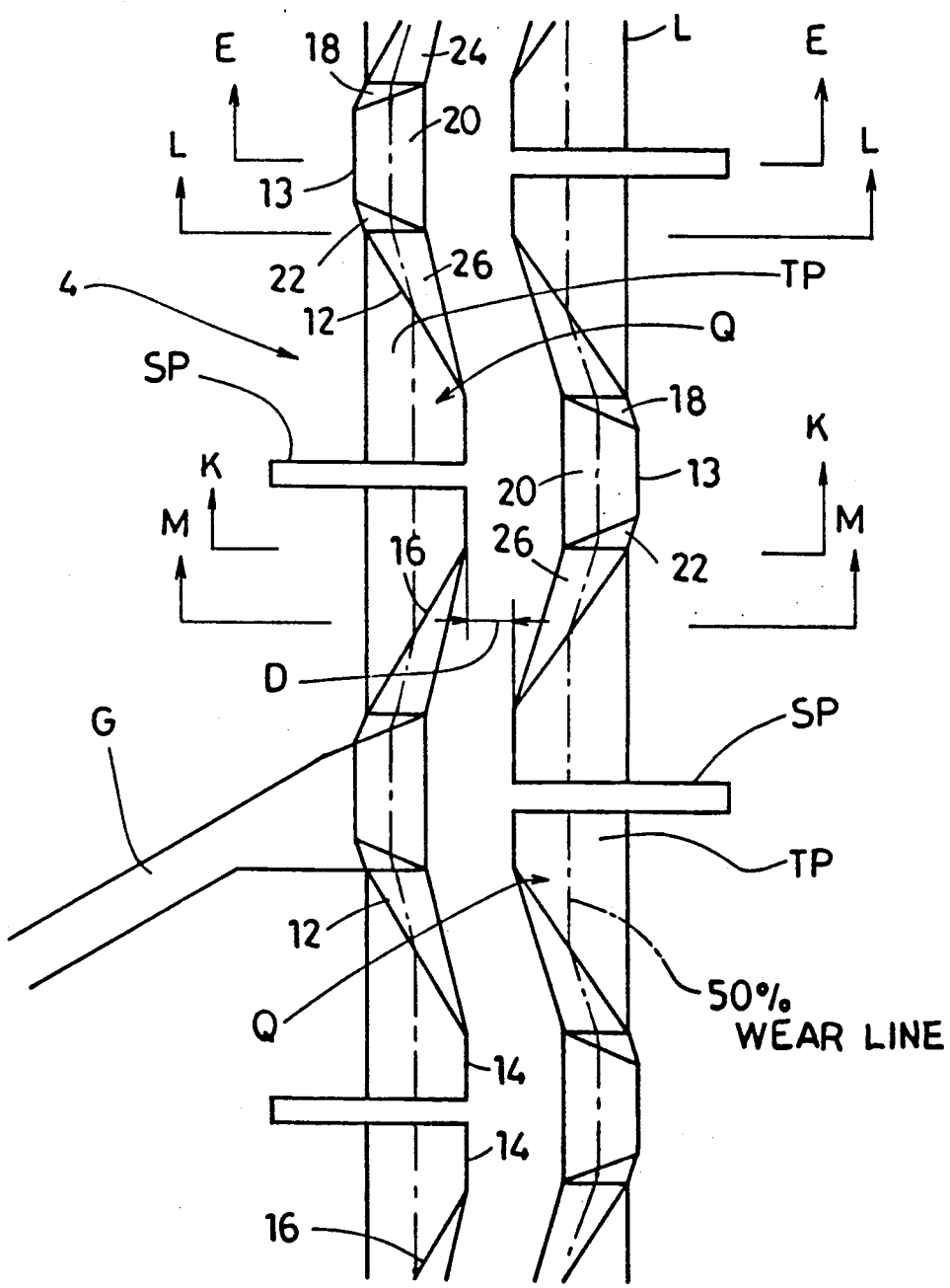
FIG. 7 is an enlarged view of a portion of one of the circumferential grooves 4 of the FIG. 1 tire.
Figure 10:
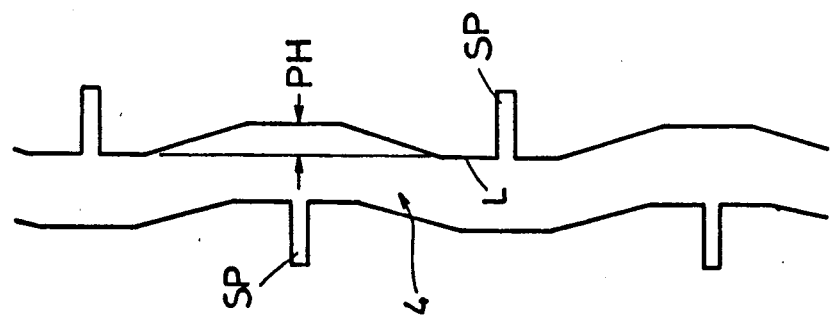
FIGS. 8 to 10 are outline plan views to show the appearance of the tread as it wears.
Figure 9:
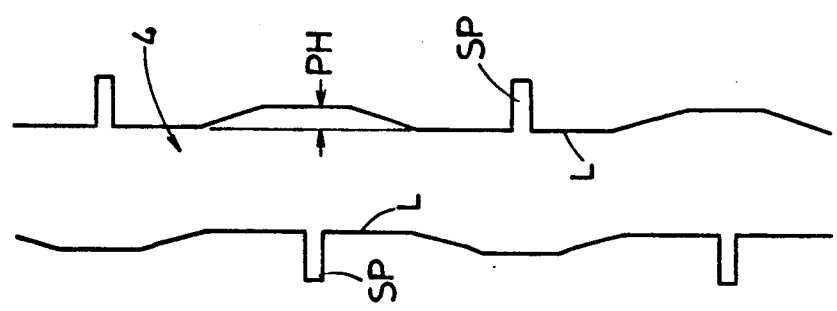
Figure 8:
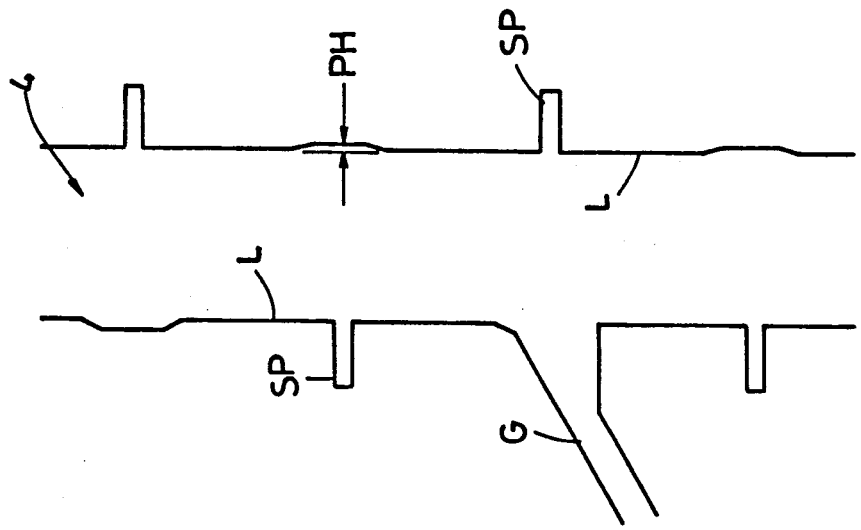

Each of the cross sectional shapes of the circumferential grooves are shown schematically in FIG. 5 (a), (b), (c) and (d) as taken respectively along lines E—E, L—L, K—K, M—M of FIG. 7. These cross-sectional shapes show only the outline of the groove and do not show all of the details such as the surface that define the point height as will be described later herein. The point-height PH of the zigzag grooves of a new tire is substantially 0 and its maximum value is 4 mm which is 2.1% of the 194 mm of tread width TW. The point height increases with wear as shown in FIGS. 8, 9 and 10.

Figure 4:
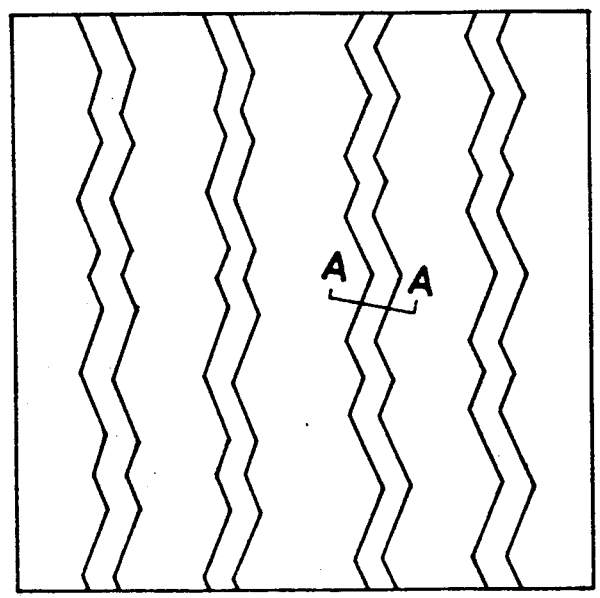
FIG. 4 is a plan view showing a part of a five rib tread pattern of a prior art tire.
Figure 4A:
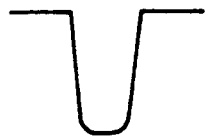
FIG. 4(a) shows the sectional groove shape taken along line A—A in FIG. 4.
Figure 5A:
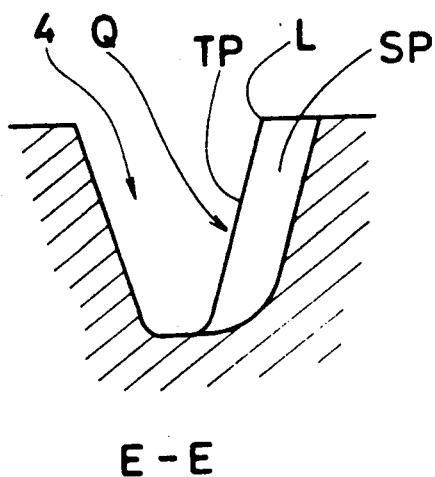
FIG. 5(a), (b), (c) and (d) are highly schematic cross sectional views of tread grooves taken respectively along lines E—E, L—L, K—K, M—M, of FIG. 7.
Figure 5B:
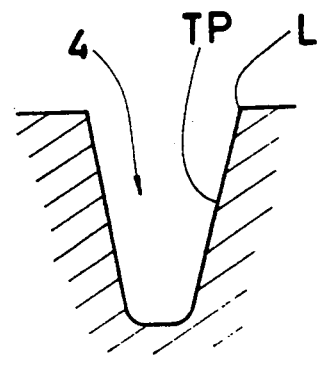
Figure 5C:
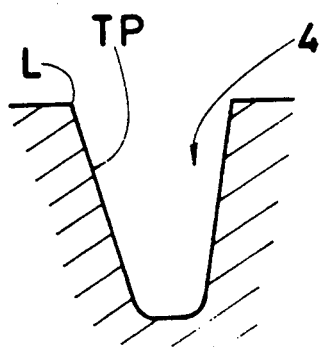
Figure 5D:
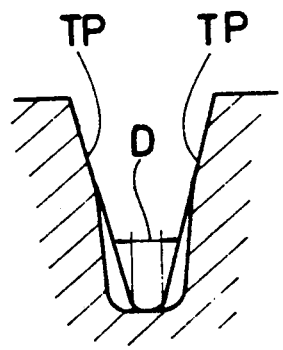
Figure 6:
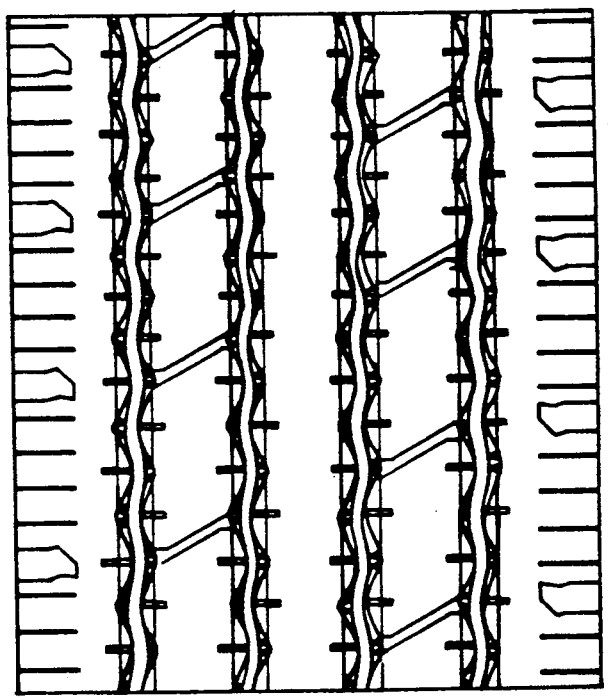
FIG. 6 is a plan view of another embodiment of the invention.

On the other hand, a control tire for a comparative test is a five rib type pattern as shown in FIG. 4, of which the point height PH of the new tire is 10 mm which is 5% of 195 mm of tread width TW and constant even when the tread wears down. This control tire has the same construction as in the embodiment according to the present invention except the tread pattern.

After each of the test tires is run on a 100% paved road under internal pressure of 7.25 kg/cm$^1$ and 2700 kg load per tire over a distance of 40,000 km, the depth of railway wear (stepwise difference d) is measured to obtain results as shown in Table 1. In this table, numerical values are expressed by an index on the basis that the control tire is 100.

As apparent from the results of Table 1, the tire according to the invention can effectively and advantageously prevent railway wear as compared with the control tires. Furthermore, the wet grip performance in the tire according to the invention shows the same test results as the prior art tire.

TABLE 1

|  | Present Invention | Prior Art |
| --- | --- | --- |
| Railway wear (d) | 46 | 100 |
| Wet grip performance (new tire) | 100 | 100 |
| Wet grip performance (after 40,000 km run) | 100 | 100 |

Turning now to FIGS. 7-10, FIG. 7 shows an enlarged view of a portion of one of the grooves 4 of the FIG. 1 tire and is thus a plan view looking into the tire groove. Letter L designates the edge between the road contact surface of the tire tread and the sidewalls of the groove 4. The sidewall of groove 4 is of a complex shape, having the above-mentioned edge L, the shape of which, when the tire is new, is shown in FIG. 8. FIG. 8 is a schematic view of the same portion of a groove 4 as shown in FIG. 7 except for the omission of all lines except those outlining edge "L", slits SP and lateral grooves G. Thus the outline shape of the groove is clearly shown. FIGS. 9 and 10 are similar, showing only edges L so as better to illustrate the changing shape and size of grooves 4 as the tire wears with 50% wear being shown in FIG. 9 and 90% wear in FIG. 10.

In FIG. 7 segments 12, 14 and 16 of the sidewall of groove 4 lie at angles to each other so as to define generally trapezoidal configuration. Each segment 12, 14 and 16 may be arcuate or a straight line or nearly a straight line. However because of the angles at which these segments lie in relation to each other (as best seen in FIG. 7) they define generally trapezoidal configuration that is repeated as a broad sinusordial wave around the entire circumference of the tire and on each side of the groove 4.

Thus the inner surface of the groove 4, that is the sidewalls thereof, form a series of trapezoidal portions that extend at least part way down, each sidewall toward the bottom of the groove 4. The trapezoidal portion of the opposed sidewalls are staggered in relation to each other so that the oppositely opposed sidewalls have trapezoidal parts alternately.

The top plane TP of each generally vertical trapezoidal part Q is flatly inclined toward the groove bottom. Accordingly, the point height PH, defined as an amplitude of the circumferential groove 4 is increased as the tread wears out and edge L of each convex part Q (defined as an intersection between the top lane TP and the tread surface) is straight and parallel to the circumferential direction of the tire so as not to form a steeply pointed edge.

The top plane TP (bounded by portions 12, 14, 16 and edge L) is formed in an trapezoidal-like configuration (in this example, trapezoid). Accordingly, the edge L of each convex part is decreased in length as the tread wears out, but as shown in FIG. 10 the edge L of a certain length remains until the last stage in the tire life.

The point height PH at the groove top is in a range of 1.5% to 0% of the tread width as shown in FIG. 8. Accordingly, the circumferential groove, when the tread is new, extends substantially straight.

The maximum value of the point height is in a range of 1% to 4% of the tread width. Accordingly, the circumferential groove, when the tread wears out, extends zigzag as shown in FIG. 10.

The trapezoidal parts protrude from the groove sidewalls into the groove so as not to extend beyond the center line of the groove, and the axial distance D (width of the groove bottom) between the opposite trapezoidal parts at the groove bottom is not less than 1% of the tread width. Accordingly, even when the tread wears out, the circumferential groove maintains good drainage properties.

Thus each of the surfaces 18, 20 and 22 is flatly inclined toward the bottom of the groove. As the tire surface wears more of the surfaces 18, 20 and 22 are worn away so that portion 13 is, in effect, moved toward the center of the groove when it becomes longer because the trapezoidal surface 20 is changing shape due to that wear.

In a similar manner, triangular surfaces 24 and 26 are also being worn away as more of the sidewall of which they are a part, is also worn away. The effect is to change the shape of the protrusion in the edge L from the pronounced configuration shown in FIG. 7 or 8 to the gentle inclination shown in FIG. 10.

It should be understood that the above described tread pattern and construction continue and is repeated around the entire circumference of the tire. In a tire having a plurality of grooves 4, preferably each of the grooves would have such a construction.

I claim:

1. A pneumatic radial tire for heavy duty vehicles, comprising a carcass ply having substantially radially extending rubber-coated steel cords;

a tread on said carcass ply provided with at least one circumferential groove extending circumferentially of the tire to divide the tread into at least two ribs;

a belt layer between the carcass ply and the tread;

said tread having protrusions alternately protruding into said circumferential groove from the opposite sides thereof;

the side edge of each rib defined in the tread surface by said circumferential groove, being such that when the tire is still new the side edges of the grooves are substantially parallel with the equatorial line of the tire, so that the point height, defined as the amplitude of the circumferential groove in the tread surface, is in a range of 0 to 1.5% of the tread width;

each of said protrusions having an inclined plane top extending from the tread surface to the groove bottom, so that the point height is increased as tread wear progresses, and the maximum value thereof becomes in a range of 1 to 4% of the tread width, said top formed in such a generally trapezoid configuration that both the outer and inner edges thereof are parallel to the equatorial line of the tire, so that the outer edge is decreased in length as the tread wear progresses, and the outer edge of a certain length remains until the last stage in the tire life.

2. A tire according to claim 1, wherein said protrusions protrude so as not to extend beyond the center line of the circumferential groove.

3. A tire according to claim 1, wherein said tread is provided on each protrusions with a sipe which divides the protrusion circumferentially and extends outwardly of the circumferential groove into the ribs.

* * * * *